United States Patent
Bell (10) Patent No.: US 7,576,727 B2
(45) Date of Patent: Aug. 18, 2009

(54) INTERACTIVE DIRECTED LIGHT/SOUND SYSTEM

(76) Inventor: Matthew Bell, 4245 Los Palos Ave., Palo Alto, CA (US) 94306

( * ) Notice: Subject to any disclaimer, the term of this patent is extended or adjusted under 35 U.S.C. 154(b) by 471 days.

(21) Appl. No.: 10/737,730

(22) Filed: Dec. 15, 2003

(65) Prior Publication Data

US 2004/0183775 A1   Sep. 23, 2004

Related U.S. Application Data

(60) Provisional application No. 60/433,158, filed on Dec. 13, 2002.

(51) Int. Cl.
*G06F 3/033* (2006.01)
(52) U.S. Cl. .................. 345/158; 345/156; 345/157; 348/744
(58) Field of Classification Search ......... 345/156–158, 345/87; 348/211, 744, 211.14
See application file for complete search history.

(56) References Cited

U.S. PATENT DOCUMENTS

| | | | |
|---|---|---|---|
| 4,843,568 A | | 6/1989 | Krueger et al. |
| 5,001,558 A | | 3/1991 | Burley et al. |
| 5,138,304 A | | 8/1992 | Bronson |
| 5,239,373 A | * | 8/1993 | Tang et al. ............... 348/14.01 |
| 5,325,472 A | | 6/1994 | Horiuchi et al. |
| 5,325,473 A | | 6/1994 | Monroe et al. |
| 5,436,639 A | * | 7/1995 | Arai et al. .................... 345/156 |
| 5,510,828 A | | 4/1996 | Lutterbach et al. |
| 5,528,263 A | * | 6/1996 | Platzker et al. ............... 345/156 |

(Continued)

FOREIGN PATENT DOCUMENTS

EP   0055366 A2   7/1982

(Continued)

OTHER PUBLICATIONS

Rekimoto, J. and Matsushita, N., "Perceptual Surfaces: Towards a Human and Object Sensitive Interactive Display," 1997, Proc. of the Workshop on Perceptual User Interfaces, Banff, Canada, pp. 30-32.

(Continued)

*Primary Examiner*—Richard Hjerpe
*Assistant Examiner*—Kimnhung Nguyen
(74) *Attorney, Agent, or Firm*—Knobbe Martens Olson & Bear LLP (57) ABSTRACT

An interactive directed beam system is provided. In one implementation, the system includes a projector, a computer and a camera. The camera is configured to view and capture information in an interactive area. The captured information may take various forms, such as, an image and/or audio data. The captured information is based on actions taken by an object, such as, a person within the interactive area. Such actions include, for example, natural movements of the person and interactions between the person and an image projected by the projector. The captured information from the camera is then sent to the computer for processing. The computer performs one or more processes to extract certain information, such as, the relative location of the person within the interactive area for use in controlling the projector. Based on the results generated by the processes, the computer directs the projector to adjust the projected image accordingly. The projected image can move anywhere within the confines of the interactive area.

32 Claims, 2 Drawing Sheets

U.S. PATENT DOCUMENTS

| | | | |
|---|---|---|---|
| 5,528,297 | A | 6/1996 | Seegert et al. |
| 5,534,917 | A | 7/1996 | MacDougall |
| 5,591,972 | A | 1/1997 | Noble et al. |
| 5,633,691 | A | 5/1997 | Vogeley et al. |
| 5,703,637 | A | 12/1997 | Miyazaki et al. |
| 5,882,204 | A | 3/1999 | Iannazo et al. |
| 5,923,380 | A | 7/1999 | Yang et al. |
| 5,953,152 | A | 9/1999 | Hewlett |
| 5,969,754 | A | 10/1999 | Zeman |
| 5,982,352 | A | 11/1999 | Pryor |
| 6,075,895 | A | 6/2000 | Qiao et al. |
| 6,084,979 | A | 7/2000 | Kanada et al. |
| 6,097,369 | A | 8/2000 | Wambach |
| 6,166,744 | A | 12/2000 | Jaszlics et al. |
| 6,176,782 | B1 | 1/2001 | Lyons et al. |
| 6,198,487 | B1 | 3/2001 | Fortenbery et al. |
| 6,308,565 | B1 | 10/2001 | French et al. |
| 6,335,977 | B1 * | 1/2002 | Kage .................. 382/107 |
| 6,339,748 | B1 | 1/2002 | Hiramatsu |
| 6,353,428 | B1 | 3/2002 | Maggioni et al. |
| 6,400,374 | B2 | 6/2002 | Lanier |
| 6,414,672 | B2 | 7/2002 | Rekimoto et al. |
| 6,454,419 | B2 | 9/2002 | Kitazawa |
| 6,501,515 | B1 | 12/2002 | Iwamura |
| 6,598,978 | B2 | 7/2003 | Hasegawa |
| 6,658,150 | B2 | 12/2003 | Tsuji et al. |
| 6,712,476 | B1 * | 3/2004 | Ito et al. ............... 353/122 |
| 6,720,949 | B1 | 4/2004 | Pryor et al. |
| 6,747,666 | B2 | 6/2004 | Utterback |
| 7,042,440 | B2 | 5/2006 | Pryor |
| 7,069,516 | B2 | 6/2006 | Rekimoto |
| 7,170,492 | B2 | 1/2007 | Bell |
| 2001/0012001 | A1 | 8/2001 | Rekimoto et al. |
| 2002/0041327 | A1 | 4/2002 | Hildreth et al. |
| 2002/0064382 | A1 | 5/2002 | Hildreth et al. |
| 2002/0103617 | A1 | 8/2002 | Uchiyama et al. |
| 2002/0105623 | A1 | 8/2002 | Pinhanez |
| 2002/0178440 | A1 | 11/2002 | Agnihorti et al. |
| 2003/0093784 | A1 | 5/2003 | Dimitrova et al. |
| 2004/0046736 | A1 | 3/2004 | Pryor et al. |
| 2004/0046744 | A1 | 3/2004 | Rafii et al. |

FOREIGN PATENT DOCUMENTS

| | | |
|---|---|---|
| EP | 0626636 A2 | 11/1994 |
| EP | 0913790 A1 | 5/1999 |
| JP | 57094672 | 6/1982 |
| WO | WO 98/38533 | 9/1998 |
| WO | WO/01/63916 | 8/2001 |

OTHER PUBLICATIONS

Pinhanez, C., "The Everywhere Displays Projector: A Device to Create Ubiquitous Graphical Interfaces," 2001, Proc. of the UbiComp 2001 Conference, Ubiquitous Computing Lecture Notes in Computer Science, Springer-Verlag, Berlin, Germany, pp. 315-331.

Kjeldsen, R. et al., "Interacting with Steerable Projected Displays," 2002, Proc. of the 5th International Conference on Automatic Face and Gesture Recognition, Washington, D.C.

Pinhanez, C. et al., "Ubiquitous Interactive Graphics," 2002, IBM Research Report RC22495, available at <http://www.research.ibm.com/ed/publications/rc22495.pdf>.

Ringel, M. et al., "Barehands: Implement-Free Interaction with a Wall-Mounted Display," 2001, Proc. of the 2001 ACM CHI Conference on Human Factors in Computing Systems (Extended Abstracts), p. 367-368.

Sparacino, Flavia et al., "Media in performance: interactive spaces for dance, theater, circus and museum exhibits," 2000, IBM Systems Journal, vol. 39, No. 3-4, pp. 479-510.

Sparacino, Flavia, "(Some) computer vision based interfaces for interactive art and entertainment installations," 2001, INTER_FACE Body Boundaries, Anomalie digital_arts, No. 2, Paris, France.

Leibe, Bastian et al., "Toward Spontaneous Interaction with the Perceptive Workbench, a Semi-Immersive Virtual Environment," Nov./Dec. 2000, IEEE Computer Graphics and Applications, vol. 20, No. 6, pp. 54-65.

Davis, J.W. and Bobick, A.F., "SIDEshow: A Silhouette-based Interactive Dual-screen Environment," Aug. 1998, MIT Media Lab Tech Report No. 457.

Paradiso, Joseph et al., "New Sensor and Music Systems for Large Interactive Surfaces," 2000, Proc. of the Interactive Computer Music Conference, Berlin, Germany, pp. 277-280.

Freeman, William et al., "Computer vision for interactive computer graphics," May-Jun. 1998, IEEE Computer Graphics and Applications, vol. 18, No. 3, pp. 41-53.

GroundFX Document, GestureTek (Very Vivid, Inc.), description available online at <http://www.gesturetek.com/groundfx>.

Keays, Bill, "Using High-Bandwidth Input/Output in Interactive Art," Jun. 1999, Master's Thesis, Massachusetts Institute of Technology, School or Architecture and Planning.

Utterback, Camille and Achituv, Romy, "Text Rain," 1999, art installation, available online at <http://www.camilleutterback.com/textrain.html>.

Muench, Wolfgang, "Bubbles", 1999, Prix Ars Electronica Catalog 1999, Springer-Verlag, Berlin, Germany; available online at <http://hosting.zkm.de/wmuench/bub/text>.

Demarest, Ken, "Sand," 2000, Mine Control, art installation, available online at <http://www.mine-control.com>.

Sester, Marie, "Access," 2001, Interaction '99 Biennial Catalog, Gifu, Japan, available online at <http://www.accessproject.net/concept.html>.

Wellner, Pierre, "Interacting with paper on the DigitalDesk," Jul. 1993, Communications of the ACM, Special issue on computer augmented environments: back to the real world, vol. 36, Issue 7, pp. 87-96.

Foerterer, Holger, "Fluidum," 1999, art installation, description available online at <http://www.foerterer.com/fluidum>.

Trefzger, Petra, "Vorwerk," 2000, art installation, description available online at <http://www.petracolor.de>.

Foeterer, Holger, "Helikopter," 2001, art installation, description available online at <http://www.foerterer.com/helikopter>.

Mandala Systems, "Video Gesture Control System Concept," 1986, description available online at <http://www.vividgroup.com/tech.html>.

Kreuger, Myron, "Videoplace," 1969 and subsequent, summary available online at <http://www.jtnimoy.com/itp/newmediahistory/videoplace>.

Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.

Fujihata, Masaki, "Beyond Pages," 1995, art installation, description available online at <http://http://on1.zkm.de/zkm/werke/BeyondPages>.

Rogala, Miroslav, "Lovers Leap," 1994, art installation, Dutch Electronic Arts Festival, description available online at <http://http://wayback.v2.nl/DEAF/persona/rogala.html>.

Snibbe, Scott, "Boundary Functions," 1998, art installation, description available online at <http://snibbe.com/scott/bf/index.htm>.

Snibbe, Scott, "Screen Series," 2002-2003, art installation, description available online at <http://snibbe.com/scott/screen/index.html>.

Keays, Bill, "metaField Maze," 1998, exhibited at Siggraph'99 Emerging Technologies and Ars Electronica 1999, description available online at <http://www.billkeays.com/metaFieldInfosheet1A.pdf>.

Hemmer, Raphael Lozano, "Body Movies," 2002, art project/installation, description available online at <http://www.lozano-hemmer.com/eproyecto.html>.

Penny, Simon et al., "Body Electric," 2003, art installation, description available online at <http://www.neuromech.northwestern.edu/uropatagium/#ArtSci>.

Penny, Simon and Bernhardt, Andre, "Fugitive II," 2004, Australian Center for the Moving Image, art installation, description online at <http://www.acmi.net.au/fugitive.jsp?>.

Elgammal, Ahmed et al., "Non-parametric Model for Background Subtraction," Jun. 2000, European Conference on Computer Vision, Lecture Notes on Computer Science, vol. 1843, pp.

Lamarre, Mathieu and James J. Clark, "Background subtraction using competing models in the block-DCT domain," 2002, IEEE Comput Soc US, vol. 1, pp. 299-302.

Stauffer, Chris and W. Eric L. Grimson, "Learning Patterns of Activity Using Real-Time Tracking," Aug. 2000, IEEE Transaction on Pattern Analysis and Machine Intelligence, vol. 22, No. 8, pp. 747-757.

Harville, Michael et al., "Foreground Segmentation Using Adaptive Mixture Models in Color and Depth," 2001, Proc. of IEE Workshop on Detection and Recognition of Events in Video, pp. 3-11.

Kurapati, Kaushal et al., "A Multi-Agent TV Recommender," 2001, Workshop on Personalization in Future TV, pp. 1-8, XP02228385.

"EffecTV" Version 0.2.0 released Mar. 27, 2001, available online at <http://web.archive.org/web/20010101-20010625re_http://effectv.sourceforge.net>.

"Index of /EffecTV," available online at <http://effectv.cvs.sourceforge.net/effectv/EffecTV/?pathrev=rel_0_2_0>.

"Supreme Particles: R111", 1999, available online at <http://www.r111.org>.

Art-Com, "Project BodyMover 2000," available online at <http://artcome.de/images/stories/2_pro_bodymover/bodymover_d.pdf>.

Penny et al., "Traces: Wireless full body tracking in the CAVE," Dec. 1999, ICAT Virtual Reality Conference, Japan.

Penny, Simon, "Fugitive," 1995-1997, available online at <http://ace.uci.edu/penny/works/fugitive.html>.

Supreme Particles, "Plasma/Architexture," 1994, available online at <http://www.particles.de/paradocs/plasma/index.html>.

Khan, Jeff, "Intelligent room with a view," Apr.-May 2004, RealTime Arts Magazine, Issue 60, available online at <http://www.realtimearts.net/article/60/7432>.

"R111, the transformation from digital information to analog matter," available online at <http://www.particles.de/paradocs/r111/10mkp2004/html/r111_text111hoch04.html>.

U.S. Appl. No. 10/160,217, Matthew Bell, Interactive Video Display System, filed May 28, 2002.

U.S. Appl. No. 11/507,976, Matthew Bell, Interactive Video Display System, filed Aug. 21, 2006.

U.S. Appl. No. 10/974,044, Matthew Bell, Method and System for Processing Captured Image Information in an Interactive Video Display System, filed Oct. 25, 2004.

U.S. Appl. No. 10/973,335, Matthew Bell, Method and System for Managing an Interactive Video Display System, filed Oct. 25, 2004.

U.S. Appl. No. 10/866,495, Tipatat Chennavasin, Interactive Display for Generating Images for Projection onto a Three-Dimensional Object, filed Jun. 10, 2004.

U.S. Appl. No. 10/946,263, Matthew Bell, Self-Contained Interactive Video Display System, filed Sep. 20, 2004.

U.S. Appl. No. 10/946,084, Matthew Bell, Self-Contained Interactive Video Display system, filed Sep. 20, 2004.

U.S. Appl. No. 10/946,414, Matthew Bell, Interactive Video Window Display System, filed Sep. 20, 2004.

U.S. Appl. No. 11/197,941, Matthew Bell, Interactive Video Display System, filed Aug. 5, 2005.

U.S. Appl. No. 11/106,898, Malik Coates, Method and System for State-Based Control of Objects, filed Apr. 15, 2005.

U.S. Appl. No. 11/142,202, Matthew T. Bell, System and Method for Sensing a Feature of an Object in an Interactive Video Display, filed May 31, 2005.

U.S. Appl. No. 11/142,115, Steve Fink, Method and System for Combining Nodes into a Mega-Node, filed May 31, 2005.

U.S. Appl. No. 11/106,084, Matthew T. Bell, Method and System for Glare Resist Processing in an Interactive Video Display System, filed Apr. 14, 2005.

U.S. Appl. No. 11/101,900, John Paul D'India, Interactive Display System with Fluid Motion Visual Effect Capability, filed Apr. 8, 2005.

U.S. Appl. No. 11/634,044, Matthew Bell, Systems and Methods for Communication Between a Reactive Video System and a Mobile Communication Device, filed Dec. 4, 2006.

* cited by examiner

INTERACTIVE DIRECTED LIGHT/SOUND SYSTEM

CROSS-REFERENCES TO RELATED APPLICATION(S)

The present application claims the benefit of priority under 35 U.S.C. § 119 from U.S. Provisional Patent Application Ser. No. 60/433,158, entitled "INTERACTIVE DIRECTED LIGHT/SOUND SYSTEM" filed on Dec. 13, 2002, the disclosure of which is hereby incorporated by reference in its entirety for all purposes.

The present application is also related to U.S. patent application Ser. No. 10/160,217, entitled "INTERACTIVE VIDEO DISPLAY SYSTEM" filed on May 28, 2002; and U.S. Patent Application Ser. No. 60/504,375, entitled "SELF-CONTAINED INTERACTIVE VIDEO DISPLAY SYSTEM" filed on Sep. 18, 2003, the disclosures of which are hereby incorporated by reference in its entirety for all purposes.

BACKGROUND OF THE INVENTION

The present invention is generally related to using human position and movement, as well as other visual cues, as input to an interactive system that reorients one or more directed light or sound sources and modifies their content in real time based on the input.

Detecting the position and movement of a human body is referred to as "motion capture." With motion capture techniques, mathematical descriptions of a human performer's movements are input to a computer or other processing system. Natural body movements can be used as inputs to the computer to study athletic movement, capture data for later playback or simulation, enhance analysis for medical purposes, etc.

Although motion capture provides benefits and advantages, motion capture techniques tend to be complex. Some techniques require the human actor to wear special suits with high-visibility points at several locations. Other approaches use radio-frequency or other types of emitters, multiple sensors and detectors, blue-screens, extensive post-processing, etc. Techniques that rely on simple visible-light image capture are usually not accurate enough to provide well-defined and precise motion capture.

Some motion capture applications allow an actor, or user, to interact with images that are created and displayed by a computer system. For example, an actor may stand in front of a large video screen projection of several objects. The actor can move, or otherwise generate, modify, and manipulate, the objects by using body movements. Different effects based on an actor's movements can be computed by the processing system and displayed on the display screen. For example, the computer system can track a path of the actor in front of the display screen and render an approximation, or artistic interpretation, of the path onto the display screen. The images with which the actor interacts can be e.g., on the floor, wall or other surface, suspended three-dimensionally in space, displayed on one or more monitors, projection screens or other devices. Any type of display device or technology can be used to present images with which a user can control or interact.

In some applications, such as point-of-sale, retail advertising, promotions, arcade entertainment sites, etc., it is desirable to capture the motion of an untrained user (e.g., a person passing by) in a very unobtrusive way. Ideally, the user will not need special preparation or training and the system will not use unduly expensive equipment. Also, the method and system used to motion capture the actor should, preferably, be invisible or undetectable to the user. Many real-world applications must work in environments where there are complex and changing background and foreground objects, changing lighting conditions and other factors that can make motion capture difficult.

Light beams created by simple flashlights, slide projectors, and video projectors, which are designed to project light or an image onto a specific location, can have their light reoriented in real time using mobile mirrors placed in front of the beam. These mirrors are often controlled by one or more stepper motors, allowing precise, computer-controlled movements. Larger motorized mounts can be controlled in a similar manner to redirect the beam by moving the entire light-producing device.

Recent work in the audio domain has produced speakers that can direct a sound beam in the same way that a spotlight directs a light beam. These speakers work by emitting directed ultrasound pulses that disturb the air in a nonlinear way so as to create audible sound in a particular direction.

In the theater and stage environments, there has been a lot of work on finding automated ways for a spotlight to track a moving person on the stage. Current solutions include having an RF (radio frequency) transmitter on the person and then using several detectors to triangulate the person's position. However, these solutions generally require the person being tracked to wear some type of transmitting device.

Hence, it would be desirable to provide an improved interactive directed light/sound system that allows effects to be generated more accurately and in a less intrusive manner.

BRIEF SUMMARY OF THE INVENTION

The present invention includes a system that allows easy and unencumbered real time interactions between people and reorientable directed light and/or sound systems (henceforth referred to as directed beams) using people's (or other objects') movement, position, and shape as input. The output of this system includes the real time physical reorienting of the directed beams and real time changes in the content projected by the directed beams.

Uses for such a device include, but are not limited to, spotlights that automatically stay on a person as s/he moves, virtual characters that move around in physical space and can interact with people in a variety of ways for informative, entertainment, or advertising purposes, interactive lighting effects for a variety of venues including concerts, dance clubs etc., interactive virtual objects for augmented-reality games, interactive information spaces, and audio instructions aimed at a single person as s/he moves around an enclosed environment.

In one embodiment, the system includes the following components: an image detection system, such as, a video camera, which produces image information; a computer which uses the image information produced by the image detection system, and possibly other information, as input to an application that controls the position and content of one or more directed beams; and one or more directed beams such as a video projector with a motorized mirror in front of it.

In another embodiment, the system includes an image detection system configured to capture information within an interactive area, a first application configured to process the information captured by the image detection system, and a second application configured to receive and use processed information from the first application to generate control information, the control information being used to control a directed beam projected at a location within the interactive area.

The interactive area includes an object. The object can be a person. The directed beam includes an image. The information captured by the image detection system includes information relating to actions taken by the object within the interactive area. The actions taken by the object include natural movements of the person, actions taken by the person with respect to the image, and interactions between the person and the image.

In one embodiment, the image detection system is designed to not suffer interference from the directed beams; for example, the image detection system may be an infrared video camera and may include its own infrared illumination.

The model of the interactive area created by the first application involves extracting information about the position and outline covered by the people or other mobile objects in the interactive area, collectively referred to as the "foreground". The remaining locations in the interactive area are collectively referred to as "background". This foreground/background classification may take the form of an image corresponding to the interactive area, with each pixel classified as foreground or background. This information is merged with information about the positions of each of the directed beams, allowing the second application to use this information to compute its output.

The directed beam may also include an audio stream, aimed toward a location within the interactive area. The audio stream may be aimed toward the location of a person, or it may be aimed at the same location as one of the projected images, giving the illusion that the image is making noises or speaking.

The second application is configured to generate the control information without the aid of information provided by a device affixed by the objects or people. The processed information generated by the first application includes background and foreground information. Based on this information, the second application generates image and audio output for the directed beams. This information is also used to determine the direction of the directed beams. Furthermore, the background and foreground information may be used to generate control information such that the location at which the directed light beam is projected is within the background of the interactive area.

In one application, the directed beam is used to provide a spotlight to follow the object within the interactive area. In another application, the image (and perhaps sound) of the directed beam represents an intelligent virtual entity.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
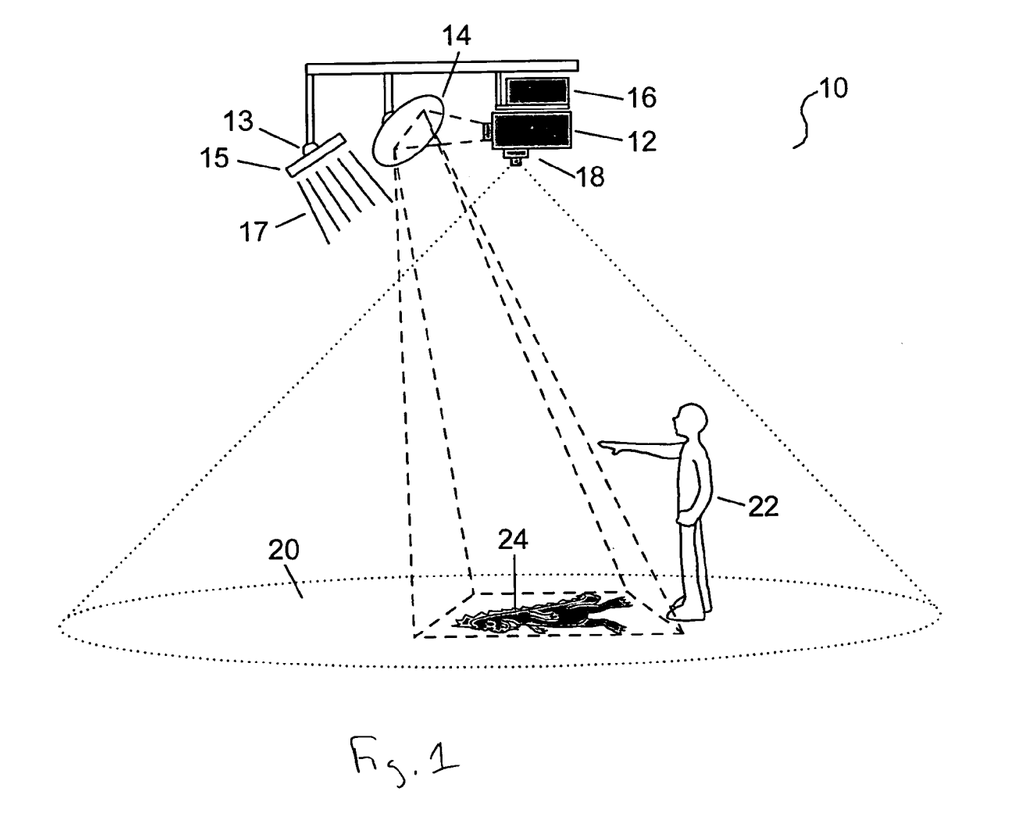
FIG. 1 is a simplified schematic diagram illustrating an exemplary embodiment of the present invention.

The present invention in the form of one or more exemplary embodiments will now be described. FIG. 1 illustrates one exemplary embodiment of the present invention. This exemplary embodiment includes a system 10 having the following components: a co-located video projector 12, a mirror 14, a computer 16 and an image detection system, such as, a camera 18, mounted on a ceiling.

The camera 18 is configured to view and capture information in an interactive area 20. For example, as shown in FIG. 1, the camera 18 is able to capture information relating to a person or user 22 located within the interactive area 20. The captured information may take various forms, and may include audio data as well as image data. The captured information is based on actions taken by the person 22 within the interactive area 20. Such actions include, for example, natural movements of the person 22 and interactions between the person 22 and the projected image 24. It should be noted information relating to the person 22 is not obtained via any type of transmitting or monitoring device being worn by the person 22. The captured information from the camera 18 is sent to the computer 16 for processing.

The computer 16 then performs one or more processes to extract certain information, such as, the relative location of the person 22 within the interactive area 20 for use in controlling the projector 12, the mirror 14 and the content of projected images. Based on the results generated by the processes, the computer 16 directs the projector 12 and the mirror 14 accordingly. The projector 12 projects an image onto the mirror 14 which, in turn, causes the image 24 to appear within the interactive area 20. For example, the computer 16 may direct the light of the projector 12 to cause the image 24 to appear to move within the interactive area 20 by adjusting the mirror 14. The adjustment may be performed by using a motorized mirror 14. The image 24 can move anywhere within the confines of the interactive area 20, and may leave the interactive area 20 in some cases.

The projected image 24 is a specific form of a directed beam. The directed beam includes any video or audio information, or a combination thereof. Optionally, the system 10 may include audio components 15 that are also controlled by the computer 16 using the results generated by the processes. For example, as shown in FIG. 1, in addition to causing the projected image 24 to appear, the computer 16 may also direct audio components 15 to generate directed sounds to the area around image 24. These audio components 15 may include a speaker system that can direct sound in a narrow beam, including parabolic speakers, and ultrasonic emitters systems such as the HyperSonic Sound (HSS) made by American Technology Corporation. The audio beam 17 may be redirected by the computer 16 to a new location by use of a motorized mount 13 for the audio components 15.

Furthermore, it should be noted that while one directed beam 24 and one directed audio beam 17 are shown in FIG. 1, multiple directed beams 24 and 17 can be generated and controlled by the system 10.

The image detection system is used to obtain a view of the interactive area 20 and any objects (including, for example, a person) located therein. As mentioned above, in one implementation, the image detection system is a camera including, for example, a video camera, a stereo video camera, a cluster of video cameras, or a time-of-flight 3D (3-dimensional)

camera system. In one implementation, the image detection system interacts with the computer 16 in real-time.

In some configurations, the directed beam produced by the projector 12 is a visible light beam. To prevent this beam from interfering with the image detection system, several methods can be employed. For example, if the image detection system is a single, stereo, or cluster of video cameras, the camera can operate at a wavelength that is not used by the projector 12 to generate the directed beam, such as, infrared. Consequently, the camera is not affected by the directed beam. Various methods can be employed to improve the quality of the camera's image and decrease interference, including the illumination of the interactive area with infrared LEDs visible to the camera and the use of a narrow-bandpass infrared filter in front of the camera. This filter only passes light of the wavelengths emitted by the LEDs. Also, the quality of the image can be further improved by strobing the LEDs in time with the camera exposure, or strobing the LEDs on and off for alternate camera frames. Some implementations of these techniques are described in U.S. patent application Ser. No. 10/160,217, entitled "INTERACTIVE VIDEO DISPLAY SYSTEM" filed on May 28, 2002, and U.S. Patent Application Serial No. 60/504,375, entitled "SELF-CONTAINED INTERACTIVE VIDEO DISPLAY SYSTEM" filed on Sep. 18, 2003.

As mentioned above, the computer 16 performs one or more processes to extract information from data provided by the image detection system. In one embodiment, these processes are designed to be modular. These processes can be implemented in the form of control logic using software or hardware or a combination of both, and may be performed by one or more computer processors.

Figure 2:
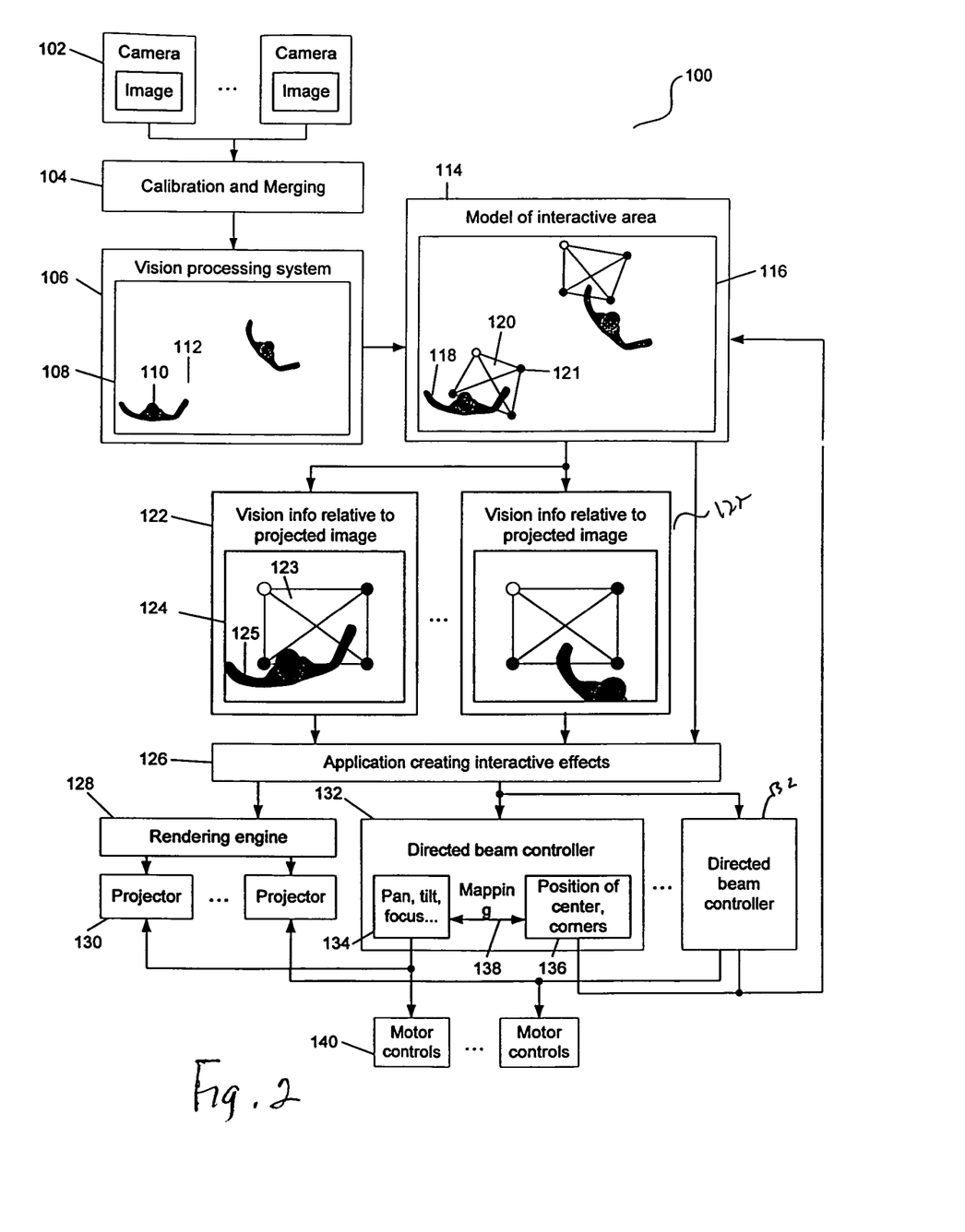
FIG. 2 is a simplified schematic diagram illustrating an exemplary embodiment of aspects of the present invention.

FIG. 2 shows one exemplary embodiment of systems of the present invention. The systems may be implemented in the form of control logic using software, hardware, or any combination thereof. System 100 includes a computer vision system for processing camera information 106, a model of real and virtual objects in the interactive area 114, an application 126 that uses the information from the interactive area model 114 to create interactive output, and a rendering engine 128 and a directed beam controller 132 that update the content and position of the directed beams, respectively.

One or more video cameras 102 produce output images in real time, which are input into a calibration and merging system 104. Calibration and merging system 104 includes information about the physical position of the area viewed by each camera such that the multiple camera images may be stitched together. In one embodiment, the information may have been attained during an initial calibration process and may include (x,y) coordinates of the position on the interactive area's surface for each of the four corners of each image. Although four corners are described, it will be understood that any number of corners may be used. Stitching the camera images together may involve making affine, perspective, or other transformations of the images and compositing them into a single image in the interactive area's coordinate space. In the case of a single camera pointed perpendicular to the interactive area, this step may not be needed. The output of calibration and merging system 104 may be a single image of all camera images composited together in a seamless manner such that the coordinates of an object in the image correspond to a scaled version of the coordinates of an object in the interactive area.

The vision processing system 106 receives the image output of calibration and merging system 104. Vision processing system 106 analyzes the image to distinguish between objects that may move, such as people and objects that may be moved, in this image of interactive area 20, collectively referred to as "foreground", and the remaining static parts of the interactive area, collectively referred to as "background". The location, movement, and actions of the foreground may eventually serve as input into the interactive application 126. This foreground/background classification may take the form of an image 108 corresponding to the interactive area, with each pixel classified as foreground 110 or background 112. Classification image 108 shows a top-down view of two people classified as foreground in the interactive area. Classifications that produce information on the shape and/or outline of each foreground object, such as the information in a classification image 108, provide the advantage of allowing more sophisticated interactions with the directed beams, such as physics simulations and gesture recognition. Vision processing system 106 may also or alternately produce and track the location of each foreground object in the interactive area. Alternatively, the vision processing system 106 may run on each camera image 102, and the calibration and mapping system 104 may then take as input the vision images for each camera, and integrate them into a single, calibrated vision image.

The model 114 of the interactive area includes a data structure 116 that stores information about the physical location of real and virtual objects within the interactive area. This allows the position and outline of foreground objects 118 to be compared with the location of the images projected by the directed beams 120. The dots 121 at the four corners of the directed beam 120 are merely schematics representing the four corners of the projector's screen, with the top left corner represented by a white dot; these dots do not represent anything about the content of the actual projected image. Since each projected image changes size and shape as it moves around, it may be important to consider the positions of the corners of the projected image, not just the center. Data structure 116 allows for the direct comparison of data from the vision processing system 106 and data about the location and boundaries of the images created by the directed beams.

Information relative to projected image 122 is a coordinate transformation of the information in the model 114 including the vision foreground/background information. The transformation is designed to undistort the projected image's screen such that its corners substantially form a rectangle 123 with the same aspect ratio as the projected image. The result is a set of locations 124 in the coordinate space of the projected image including information about the location and shape of vision foreground information 125 and any other directed beams that may overlap the projected image. The transformed vision foreground information may take the form of an image, with each pixel classified as foreground or background. Alternately or in addition, information about the locations of foreground objects may be provided as a transformed coordinate value. The necessary coordinate transformations may be accomplished via an affine, perspective, or other such transformation as is known in the art. Many methods also exist for rendering a coordinate-transformed image onto another image, including rendering engines such as OpenGL.

Set of locations 124 allows direct analysis of the physical overlap between the undistorted content of the projected image and foreground objects in the interactive area. This simplifies the computation of interactions between these foreground objects and virtual objects in the projected image, as well as the generation of visual effects in the projected image based on the position or outline of the foreground objects. In addition, it allows the computation of overlap between the projected image and any content from another directed beam, allowing the creation of black masks that prevent the content of the two projected images from overlapping.

The application 126 that creates interactive effects includes any software, hardware, or any combination thereof that takes as input the model of interactive area 114 and/or the vision information relative to projected images 122 as well as other inputs, and outputs content and position for one or more directed beams. This application is open-ended, and can be programmed to have any desired output behavior given its inputs. Examples of output for application 126 include an interactive character, a virtual sport, or a set of visual effects or spotlights that follows users around. Depending on the design of the application, it may choose to use the vision data relative to the undistorted projected images 122, or it may choose to use the model of the overall interactive area 114 in determining its outputs.

The rendering engine 128 receives input image information from the application 126 about the content to be rendered for each directed beam. This image information may take the form of images, textures, points, vectors, polygons, and other data that may be supplied to a rendering engine. Also, more than one rendering engine may be present. The outputs of these rendering engines are images to the video projectors 130 or other display devices controlled by the application. These display devices receive video image inputs in any one of a variety of standard ways, including analog composite, s-video, 15-pin analog, and DVI.

The directed beam controllers 132 receive input from the application 126 about the desired new positions of the directed beams. This information may be provided in a variety of ways. Many of these ways involve specifying information in the coordinate space of the model 114 of the interactive area. For example, a direction and speed of motion for each beam may be specified, or a destination location and a time to arrive there. However, this information may not directly correspond to settings 134 for mirror 14 or the mount motors on the directed beam. Thus, a mapping 138 between information about the motor settings 134 and the physical position 136 in the interactive area of the screen may be used. The mapping may be established during a calibration process for each directed beam, and allow the translation of any physical position information within the interactive area into a new group of settings for the motors 140. These motors may be controlled by the controller 132 in a variety of ways, including the DMX protocol, a serial connection, and Ethernet. A variety of off-the-shelf motor control mechanisms using these protocols exist, including the I-Cue Intelligent Mirror by Rosco Laboratories. The I-Cue is a mirror connected to two motors that can control the pan and the tilt of the mirror. The motors can be controlled via the DMX protocol from a computer.

In addition, as the position of the projected image changes, the projected image may need to be refocused. Unless an autofocus system is included in the projector, the focus settings for each position of the image may be found as part of the mapping 138. The focus information may then be sent to the projector 130. The information may be sent through a variety of methods, for example, a serial or Ethernet connection. Finally, the information about the new positions of the corners of the screen of each directed beam may be passed back to the model 114 of the interactive area in order to provide up-to-date information.

The system 100 may also incorporate one or more directed audio beams. The control systems are very similar to those of directed video beams, except that the application 126 would provide sound information to be played on the speakers of the directed audio beams as well as provide information to a directed beam controller 132 that has the correct mapping 138 for the audio beam.

In one embodiment, one process is designed to handle detection and/or identification of interesting features of the interactive area 20 viewed by the image detection system. Another process is designed to utilize the information produced by the previous process to generate an output that is used to control the directed beam. A number of illustrative, non-exhaustive examples of each process are described below.

For ease of reference, the components that are used to provide feature detection is referred to as the vision processing system 106. There are several things that can be sensed using the vision processing system 106. One such feature is whether each pixel in the image or scene of the interactive area 20 should be treated as foreground or background. Examples of the vision processing system are described in U.S. patent applications Ser. No. 10/160,217, entitled "INTERACTIVE VIDEO DISPLAY SYSTEM" filed on May 28, 2002 and Ser. No. 10/514024, entitled "INTERACTIVE VIDEO DISPLAY SYSTEM" filed on Oct. 24, 2003, which is adept at separating foreground and background using an image input provided by a single video camera. If a stereo camera is used to provide image input, then a stereopsis algorithm (either in hardware or in software) can be used to derive 3D information about the scene. This 3D information can be used to define or refine foreground/background distinctions. Using a time-of-flight camera, the 3D information can be obtained directly from the hardware.

Using the foreground/background distinctions, and optionally camera output and/or 3D information as well as other types of information, a variety of person tracking algorithms can be applied to get a constant knowledge of the present and past positions of objects in the interactive area 20.

Data generated by the vision processing system 106, and optionally other types of inputs, are used to produce an output that is used to control the directed beam. Such control can be effected through orientation, motion or content information. In one embodiment, the output that is used to control the directed beam is generated by a computer application residing within the computer 16. The computer application can be implemented using software, hardware or a combination of both.

Data generated by the vision processing system include, but are not limited to, the foreground/background classification of the image of the interactive area 20, person tracking information, and 3D scene information about the interactive area 20. In addition, other types of inputs include sound, temperature, keyboard input, RF tags, communications with wireless devices etc.

An appropriate spatial translation system is used such that the information from the vision processing system and information about orientations of the directed beam can be mapped into a single model of physical space, allowing an application to align the physical location of its outputs with the physical location of its inputs. A variety of simple calibration schemes can be devised to allow this mapping to be created.

In one embodiment, the image produced by the camera 18 is considered the primary representation of the interactive area, and all other information is translated into the coordinates of this image. However, in other embodiments, the images produced by one or more cameras 18 are translated into a single model 114 of the physical space of the interactive area, which has a coordinate system based on the physical distances between locations in the interactive area. In this latter case, a calibration method may be employed to map each camera's image to the model of the interactive area. Several such methods may be used. For example, one such method involves placing reflective dots or other machine-recognizable patterns at known locations on the ground in the interactive area. These dots may be placed in a regular grid pattern in the interactive area. A human user then uses a computer input device to input the (x,y) coordinates in physical space of at least four dots visible in the camera's image. This procedure is repeated for each camera 18. The end result is a correspondence between points in each camera's image and points in physical space that allows transformation parameters to be computed in system 104, allowing the various camera images to be merged into a single image with a known correspondence to the physical space of the interactive area.

The directed beams may be calibrated to this model 114 such that there is a known mapping between the settings of the directed beam and the beam's position within the interactive area. The directed beam parameters may be mapped to either coordinates of a camera's image or coordinates of the physical space of the interactive area. Several calibration methods may be employed. One such calibration scheme involves pointing each directed beam at series of specific locations within the interactive area. For each location, a marker recognizable to the vision processing system such as a reflective dot is placed at the center of the directed beam. If the directed beam is a projector, additional information such as the position of the four corners of the screen may also be gathered with the aid of reflective dots. By doing this for a variety of locations throughout the interactive area, a reliable mapping can be devised. Using interpolation from nearby locations or curve fitting techniques as known in the art, the (x,y) coordinates of any location that was not observed during calibration can be translated into pan and tilt settings that the directed beam (as well as other information that may have been recorded, such as the positions of the corners of the screen in a projector) would have at that location. This ability to translate between (x,y) coordinates in the interactive area to settings for a directed beam is what allows the system 100 to control the directed beams in the desired fashion.

The output of the processing software from the previous component is projected either visually or aurally using a system that can direct light or sound in a particular direction. The direction and content can change over time. Directed light display systems include, but are not limited to simple spotlights, slide projectors, gobos, and video projectors. Directed audio systems include, but are not limited to, parabolic speakers and ultrasonic emitters that produce audible sound upon interaction with air.

The directed beam can be reoriented in several ways. In one implementation, the component generating the directed beam is on a mount with two or more degrees of freedom and is motorized and controlled by the computer 16. In another implementation, the path of the light beam is directed using a mirror or series of mirrors placed in front of the beam. This mirror or set of mirrors would also be motorized, with its orientation controllable in real time by the computer 16.

There are multiple possible physical configurations of the different components as described above. For example, the directed beam can be aimed either at a wall or the ground. In one implementation, the image detection system is positioned as close to the directed beam as possible to make the scene viewed by the image detection system the same scene as the one that the directed beam is projected onto. However, this need not be the case, especially if a 3D camera is used as the image detection system.

The following illustrates a number of examples or applications where the system 10 can be deployed. In one application, the system 10 can be used to produce a "follow spot" effect. The system 10 can direct a directed beam in the form of a spotlight to follow a person as s/he moves around within a defined area. Unlike a manually operated spotlight, this spotlight can automatically and accurately track the person with little or no human input at the control end.

By using a gobo or video projection system as a spotlight, the spotlight is able to change over time based on other input data, including, but not limited to, the position, shape, or movement of the person in the spotlight.

In an alternative application, the system 10 uses a directed beam in the form of a directed audio stream instead of a light beam. The system 10 can be used to deliver a specialized audio stream to a single person as s/he moves around within a defined area. This could be used to allow a person to hear music without disturbing others and without the encumbrance of headphones. It could also be used to deliver private instructions, information, advertisements, or warnings to one or more persons. This directed audio system could be augmented with a directed microphone pointed in the same direction, allowing two-way conversation. The conversant at the computer end could either be a human being or a voice recognition computer interface.

As mentioned above, in other applications, multiple directed beams can be deployed and such beams can take various forms including, for example, video, audio, and audio/video data.

In yet another application, the system 10 can be used to create an intelligent virtual entity whose image moves around in the physical world. This entity could be created with a projector including, for example, a slide projector or gobo and a video projector. In one implementation, a video projector is used allowing the entity's image to change over time in complex and myriad ways. The entity could take a variety of appearances, including, but not limited to, an abstract shape, a logo, a text message, or a static or animated virtual character.

In order for the virtual entity to move in a realistic way, it would be preferable for the virtual entity's image to avoid moving onto other objects, such as, people or tables. The movement of the virtual entity's image can be controlled by the vision processing system as described above. For example, by classifying the image of the interactive area 20 to produce a background/foreground distinction, the system 10 can restrict the virtual entity to only move within background areas.

Furthermore, the virtual entity can interact with the person(s) in the interactive area 20 in a variety of ways. For example, the virtual entity could follow people around; the virtual entity could try to stand in front of people; the virtual entity could lead people to a specific location; the virtual entity could be pushed, pulled, or otherwise moved by person(s) approaching or touching its image.

In addition, the virtual entity could contain active regions that generate a reaction when a person moves a part of his/her body into one or more of those regions. The virtual entity could change appearance or behavior when a person interacts with its image. The specific portion of a virtual entity's image that the person is interacting with could be determined by the vision processing system and used to modify the virtual entity's appearance or behavior with further specificity. See, for example, U.S. patent application Ser. No. 10/160,217, entitled "INTERACTIVE VIDEO DISPLAY SYSTEM" filed on May 28, 2002, for an illustrative description of how a display can be altered based on a person's position and shape.

Optionally, the virtual entity can be augmented with directed speakers to allow it to broadcast sound in the immediate area around its image, as well as a directed microphone to allow two-way conversation between people near the image. The virtual entity's ability to speak and understand speech can be provided by either a human being or a voice recognition computer interface.

Uses for the "intelligent virtual entities" configurations are numerous. For example, whether an object or a character, these entities could provide entertainment value through their range of behaviors and appearances, and their ability to interact with people in a variety of ways. The virtual entities could take the form of virtual playmates that educate or entertain children or adults. The virtual entities could also be used to add atmospheric and/or aesthetic value to a particular location or environment. For example, a virtual scorpion could crawl around a desert-themed restaurant, adding to the ambiance. As another example, a virtual character could act as a greeter for a store, welcoming people as they come in. The virtual entities can also be used as advertising tools, promoting particular brands or products in an engaging and interactive way. The virtual entities could also take the form of informational tools, assistants who can move within the world and provide information to people. This informational exchange could take the form of a visual dialogue, in which the virtual entity presents a person with a visual menu of selectable options. In addition, the virtual entities could be used to direct people. For example, a virtual entity could keep people from entering a forbidden area by appearing in front of someone if a person is about to enter the area, and giving the person either a visual or audio warning or both. The virtual entities could be used in a variety of augmented reality games, such as, items, balls, players, or other thing important to a game. This list of uses is not meant to be exhaustive, and the examples provided herein are for illustrative purposes only.

Accordingly, embodiments of the present invention are able to detect actions or interactions by an object when the projected image, the projection surface, or lighting conditions are dynamic. Also, system 100 is able to detect actions or the motion of objects, such as people, outside of the projected image. This is because the vision system is independent of the directed beam's image. The vision system can also capture the full outline of objects in the interactive area at all times.

Based on the disclosure and teachings provided herein, a person of ordinary skill in the art will appreciate other ways and/or methods to deploy embodiments in accordance with the present invention.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An interactive directed beam system comprising:
an image detection system configured to capture information within an interactive area, the captured information including information relating to unencumbered actions taken by a person within the interactive area, the unencumbered actions including those actions omitting a tracking or transmission device;
a vision processing system configured to process the information captured by the image detection system to generate a classification image that includes foreground and background information;
an interactive media engine configured to use the classification information to generate control information including information related to interaction with a video image displayed in a directed beam;
a directed beam controller configured to control a directed beam including a video image, the directed beam projected within the interactive area in response to the control information and information related to interaction with the video image displayed in the directed beam; and
a speaker system configured to generate a directed audio stream responsive to the control information, wherein the directed audio stream accompanies the projection of the directed beam, the directed audio stream delivering sound to the interactive area.

2. The system of claim 1 wherein the image detection system includes a camera.

3. The system of claim 1, wherein the unencumbered actions taken by a person within the interactive area include natural movements of the person.

4. The system of claim 3, wherein the natural movements of the person include actions taken by the person with respect to the video image.

5. The system of claim 1 wherein the sound from the directed audio stream is not audible by a person outside the interactive area.

6. The system of claim 5, wherein the directed audio stream is aimed toward the person within the interactive area utilizing a motorized mount to control the direction of the speaker system.

7. The system of claim 6, wherein the speaker system includes parabolic speakers.

8. The system of claim 6, wherein the speaker system includes an ultrasonic emitter. control the direction of the speaker system.

9. The system of claim 1, wherein the classification information identifies a background of the interactive area and the person, the classification information used by the interactive media engine and directed beam controller to cause the projector to project the directed beam within the background of the interactive area.

10. The system of claim 1, wherein the directed beam controller causes the projector to project an image that follows the person within the interactive area.

11. The system of claim 1, wherein the video image represents an intelligent virtual entity.

12. The system of claim 1 wherein the interactive area is a three-dimensional region.

13. An interactive directed beam system comprising:
an image detection system configured to capture information within an interactive area, the information captured by the image detection system including information relating to unencumbered actions taken by a person within the interactive area, the unencumbered actions including those actions omitting a tracking or transmission device;
a computer configured to process the information captured by the image detection system to generate control information including information related to interaction with a video image displayed in a directed beam;

a projector configured to receive and use the control information including information related to interaction with a video image displayed in a directed beam, the projector further configured to project a directed beam, the directed beam including a video image, the directed beam projected within the interactive area; and a speaker system configured to generate a directed audio stream responsive to the control information and accompanying the directed beam, wherein the directed audio stream delivers sound to the interactive area.

14. The system of claim 13, wherein the unencumbered actions taken by the person include natural movements.

15. The system of claim 13, wherein the unencumbered actions taken by the person include actions taken by the person with respect to the video image.

16. The system of claim 13, wherein the video image represents an intelligent virtual entity.

17. The system of claim 13 wherein the information processed by the computer includes background and foreground information generated by the image detection system.

18. The system of claim 14, wherein the background and foreground information is used to identify a background of the interactive area and the person, the background and foreground information included in the control information such that the projector projects the directed beam within the background of the interactive area in response to the control information.

19. The system of claim 13, wherein directed audio stream follows the image within the interactive area.

20. ) The system of claim 13 wherein the interactive area is a three dimensional region.

21. The system of claim 13 wherein the directed audio stream is a narrow sound beam that is attenuated outside the interactive area.

22. The system of claim 13 wherein the sound of the directed audio stream is audible by a person only if the person is within the interactive area.

23. The system of claim 13 wherein the sound of the directed audio stream is audible by only one person within the interactive area.

24. The system of claim 13 further comprising a motorized mirror responsive to the control information and configured to reflect the directed beam within the interactive area.

25. A method f or directing an interactive beam, the method comprising:
capturing information using an image detection system, wherein the information captured by the image detection system includes information relating to unencumbered actions taken by a person within an interactive area, the unencumbered actions including those actions omitting a tracking or transmission device;

processing the information to generate a classification image that includes foreground and background information;

generating control information based upon the classification image, the control information including information related to interaction with a video image displayed in a directed beam;

projecting one or more directed beams within the interactive area using a projector configured to use the control information to control the one or more directed beams, the one or more of the directed beams including a video image; and delivering sound to the interactive area using a directed audio stream responsive to the control information.

26. The method of claim 25, wherein the unencumbered actions taken by the person include natural movements of the person.

27. The method of claim 25, wherein the unencumbered actions taken by the person include actions taken by the person with respect to the video image.

28. The method of claim 25, wherein the video image represents an intelligent virtual entity.

29. The method of claim 25, wherein the directed audio stream is only audible by a person within the interactive area.

30. The method of claim 25, wherein the background and foreground information is used to identify a background of the interactive area and the person, the background and foreground information included in the control information such that at least one of the one or more directed beams are directed only within the background of the interactive area.

31. The method of claim 25 wherein at least one of the one or more directed beams includes a spotlight that follows the person within the interactive area.

32. The method of claim 25 wherein the interactive area is a three-dimensional region.

* * * * *

UNITED STATES PATENT AND TRADEMARK OFFICE
CERTIFICATE OF CORRECTION

PATENT NO. : 7,576,727 B2 Page 1 of 1
APPLICATION NO. : 10/737730
DATED : August 18, 2009
INVENTOR(S) : Matthew Bell It is certified that error appears in the above-identified patent and that said Letters Patent is hereby corrected as shown below:

Column 12
In Claim 8, lines 41 and 42, after "emitter." delete "control the direction of the speaker system.".

Column 13
In Claim 15, line 13, delete "Claim 13,wherein" and insert --Claim 13, wherein--.
In Claim 18, line 21, delete "claim 14," and insert --claim 17,--.
In Claim 20, line 31, delete ") The" and insert --The--.
In Claim 20, line 32, delete "three dimensional" and insert --three-dimensional--.

Column 14
In Claim 25, line 1, delete "f or" and insert --for--.

Signed and Sealed this

Second Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,576,727 B2
APPLICATION NO. : 10/737730
DATED : August 18, 2009
INVENTOR(S) : Matthew Bell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this

Seventh Day of September, 2010

David J. Kappos
*Director of the United States Patent and Trademark Office*